July 17, 1962   M. P. POITEVIN DE FONTGUYON   3,044,343
OPTICAL INSTRUMENT OF THE REFLECTION TYPE
Filed April 16, 1959   3 Sheets-Sheet 1
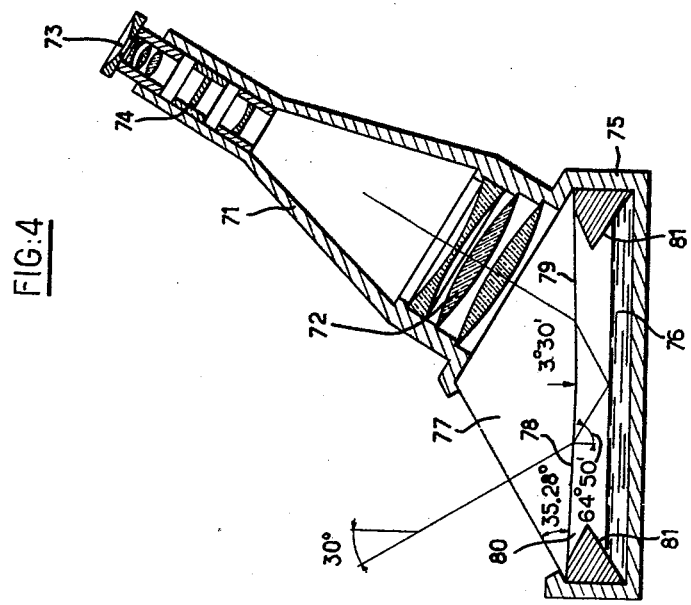
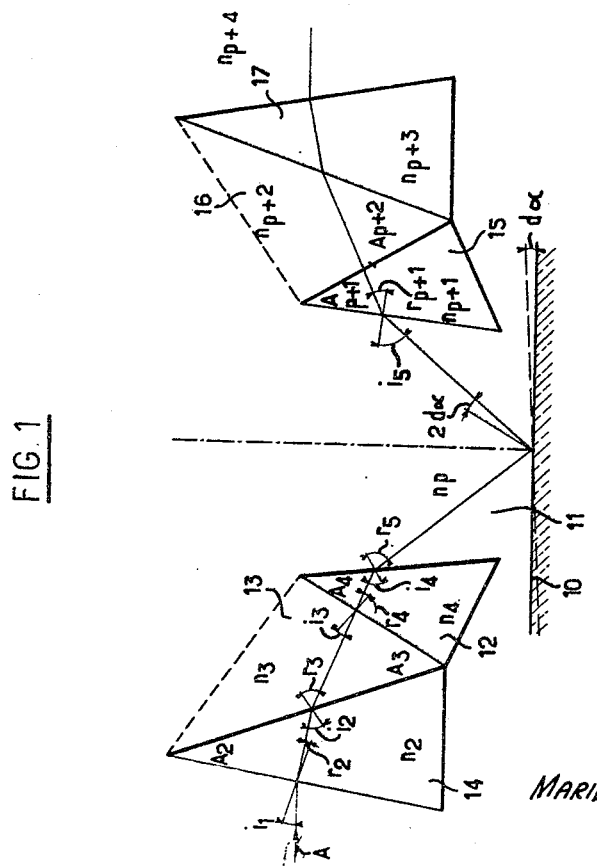
INVENTOR
MARIE P. POITEVIN DE FONTGUYON
BY Irwin S. Thompson
ATTY.

July 17, 1962 M. P. POITEVIN DE FONTGUYON 3,044,343
OPTICAL INSTRUMENT OF THE REFLECTION TYPE
Filed April 16, 1959 3 Sheets-Sheet 2
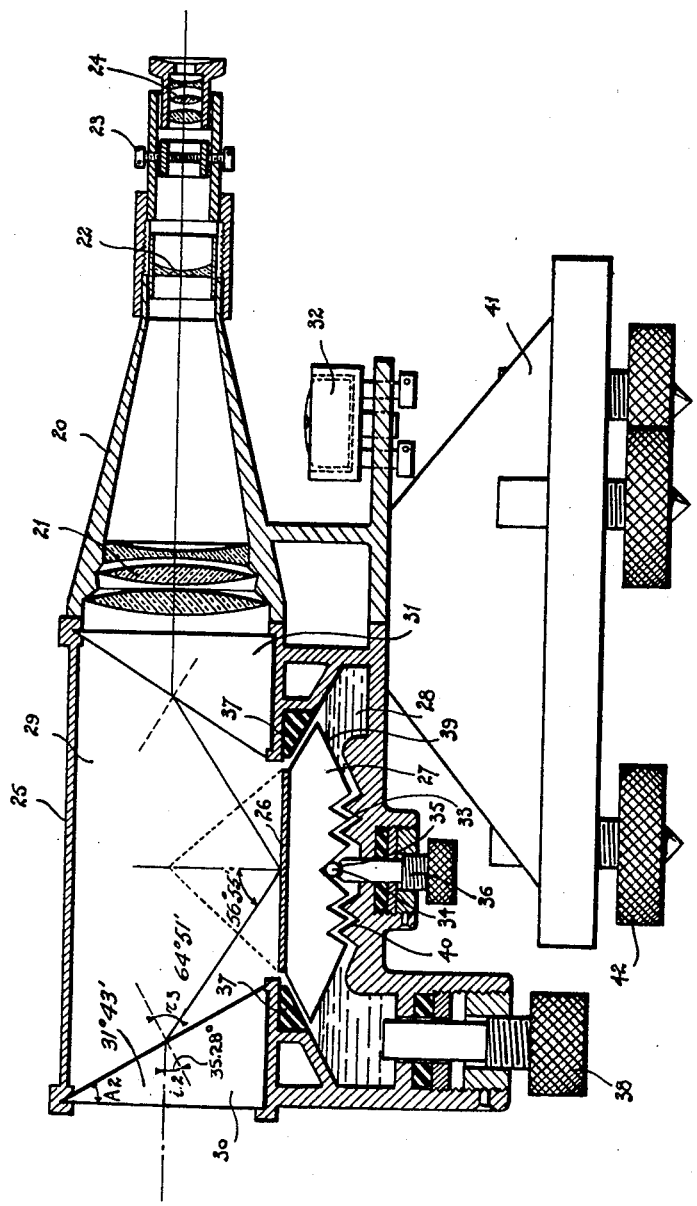
INVENTOR
MARIE P. POITEVIN DE
FONTGUYON
BY Irwin N. Thompson
ATTY.

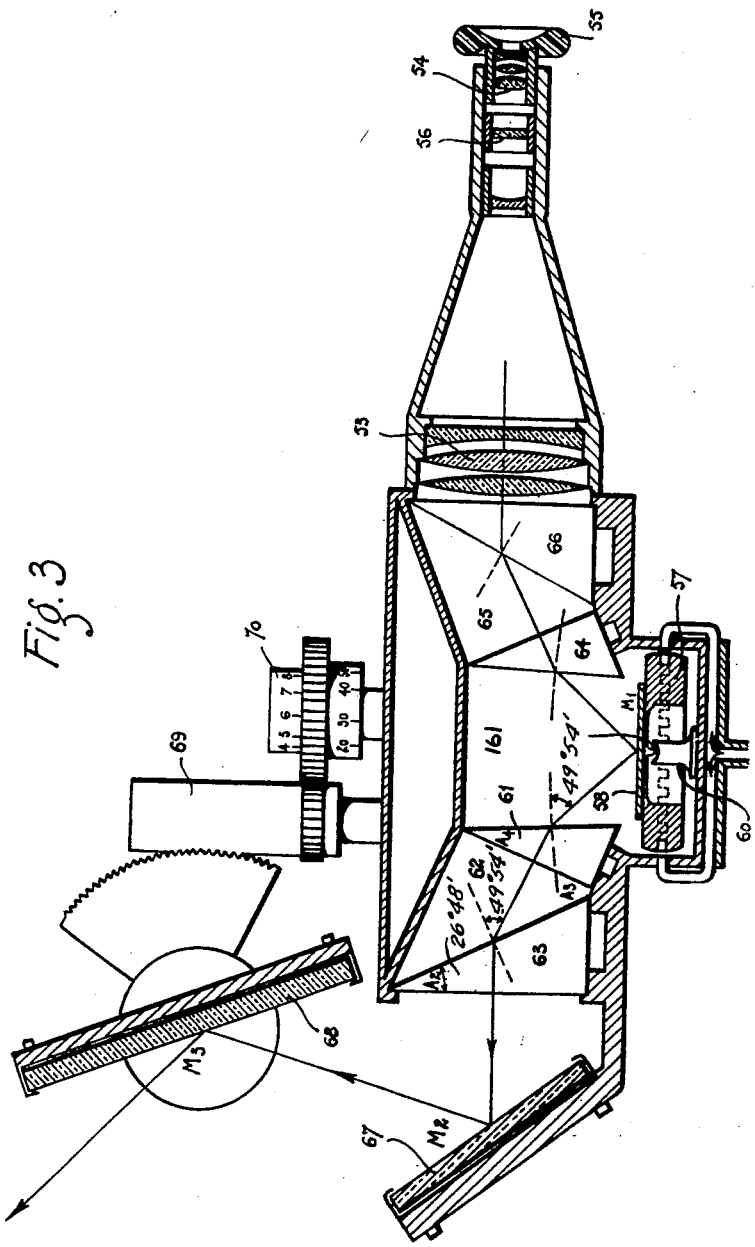

United States Patent Office 3,044,343
Patented July 17, 1962

3,044,343
OPTICAL INSTRUMENT OF THE REFLECTION TYPE
Marie Pierre Poitevin de Fontguyon, 159 Rue de l'Universite, Paris, France
Filed Apr. 16, 1959, Ser. No. 806,858
Claims priority, application France Apr. 17, 1958
15 Claims. (Cl. 88—2.3)

The present invention has for its object arrangements for optical instruments of the reflecting type and permitting of either the amplification or the reduction or even the elimination—in other words the optical damping—of small variations of the angle between the reflected beam and the reflecting surface, these variations being correlated with the small variations of incidence of the entering or entered beam.

In accordance wtih the invention, the optical arrangement is characterised in that on the path of the beam is interposed at least one transparent medium constituting a deformable volume which is traversed—before and after reflection—under adequate incidences, the values of which are a function of the indices of refraction of said deformable medium and of the other mediums traversed before and after reflection on the reflecting surface to the orientation of which at least one face of the deformable volume is permanently fixed.

The transparent medium constituting the deformable volume may be a liquid of suitable viscosity and refringency or simply water. This medium may be a gas or a vapor, air, or even a more or less pronounced vacuum. It may also be a diasporometer, that is to say a device which is similar to a solid prism with a variable angle.

The face which is fixed to the reflecting surface is either constiuted by the reflecting surface itself or separated from this surface by a transparent medium having a definite shape such as a blade with parallel faces, a prism or a lens.

Apart from the face which is fixed to the reflecting surface, the surface of the deformable volume through which the beam passes may consist of a single plane surface or else of a combination of several surfaces which may be of any kind but which have predetermined relative orientations.

The reflecting surface may be of any particular kind. It can be an ordinary plane mirror. It may also be constituted by the surface of equilibrium of a liquid, in particular a bath of mercury or amalgam, especially in the case in which the orientation of the beam is fixed in the horizontal position. It may also be any kind of mirror orientated in a determined manner by gyroscope, by flotation or suspension or by the action of a force other than gravity, for example by a magnetic field.

The surfaces limiting the deformable transparent medium may be of any kind. They can be one or a number of blade surfaces having parallel faces, one or a number of prism faces, the blades or prisms being of glass or other suitable refringent material. In the case in which the deformable medium is a transparent liquid, they may consist of the surface of equilibrium of this liquid without specail need for the material agency of a solid body. They may also consist of the face of a lens or the surface of a mirror.

Other transparent media constituting indeformable solids, or even transparent fluids contained in rigid envelopes or the free separating surfaces of which constitute optical faces, may be associated with the deformable transparent medium and the beam may also be subjected to single or multiple reflections produced by reflecting surfaces which are integral with the instrument; the refractions and reflections being associated with the reflection under a slightly variable incidence correlated with the small disorientation of the reflecting surface with respect to the remainder of the deformable volume.

As a rule the device is symmetrical in its active elements on each side of the reflection under a slightly variable incidence. This reduces the effects of dispersion of light when the light is not monochromatic.

The device in accordance with the invention can be adapted to very many applications in a large number of optical instruments for measurement or adjustment.

In fact it permits of the amplification of small rotations of the reflected light beam, thus increasing the sensitivity and the accuracy of measurement of small rotations. This amplification of small rotations may also be used to advantage in automatic devices controlled by the action of a light beam, for example by excitation of photoelectric cells.

Instead of producing amplification, the device in accordance with the invention can provide a reduction of the small rotations and in particular enables a small rotation of the reflected beam to be obtained equal to that of the reflecting surface, while a simple mirror produces a double rotation.

The use of a device of this kind enables the rotation of the reflected beam to be nullified in spite of small rotations of the device, provided that the reflecting surface remains in a fixed position. This optical damping can be used to advantage in artificial horizons, levelling devices with automatic level setting, etc.

The invention will be more fully described below with reference to the accompanying drawings in which:

FIG. 1 is a diagram explaining the effect of the relative disorientation of the reflecting surface with respect to the indeformable remainder of the deformable volume.

FIG. 2 is a view in cross-section of a levelling instrument having automatic level setting, with floating mirror.

FIG. 3 is a view in cross-section of a gyroscopic sextant.

FIG. 4 is a view in cross-section of an automatic astrolabe.

Reference being made to FIG. 1, the reflecting surface of the instrument may be seen at 10. This surface 10 is arranged so as to receive relative rotations having an amplitude $d\alpha$. The said surface is associated with a deformable volume 11 lined with a transparent material having a suitable index $n_p$, this volume 11 being traversed by the light beam A, which is directed through a series of prisms 12, 13, 14 so as to penetrate into the deformable volume 11 at an adequate incidence. After reflection of the beam on the surface 10, the prisms 15, 16, 17 determine the path of the reflected beam.

If the light beam is followed along its path through the successive media having the refraction indices $n_1$, $n_2 \ldots n_p-1$ having the fixed apex angles $A_1, A_2, \ldots$ $A_{p-1}$, the following relations are obtained between the angles of incidence $i$, and refraction $r$ and at the apex $A$:

$$i_2 + r_2 = A_2$$
$$i_3 + r_3 = A_3 \qquad (1)$$
$$\cdots$$
$$i_{p-1} + r_{p-1} = A_{p-1}$$

and by differentiating these equations:

$$di_2 + dr_2 = 0$$
$$di_3 + dr_3 = 0 \qquad (2)$$
$$\cdots$$
$$di_{p-1} + dr_{p-1} = 0$$

On the other hand, in accordance with the laws of refraction:

$$n_1 \sin i_1 = n_2 \sin r_2$$
$$n_2 \sin i_2 = n_3 \sin r_3 \qquad (3)$$
$$\cdots$$
$$n_{p-1} \sin i_{p-1} = n_p \sin r_p$$

and by differentiating these equations:

$$n_1 \cos i_1 di_1 = n_2 \cos r_2 \, dr_2$$
$$n_2 \cos i_2 di_2 = n_3 \cos r_3 \, dr_3 \qquad (4)$$
$$\cdots$$
$$n_{p-1} \cos i_{p-1} di_{p-1} = n_p \cos r_p \, dr_p$$

By multiplying the terms of the Equations 4 this produces:

$$n_1 \cos i_1 \, di_1 \cdot n_2 \cos i_2 \, di_2 \ldots n_{p-1} \cos i_{p-1} \, di_{p-1} =$$
$$n_2 \cos r_2 \, dr_2 \cdot n_3 \cos r_3 \, dr_3 \ldots n_p \cos r_p \, dr_p$$

which in view of (2) may be simplified as follows:

$$n_1 \cos i_1 \cos i_2 \ldots \cos i_{p-1} \, di_1 =$$
$$\pm n_p \cos r_2 \ldots \cos r_p \, dr_p$$

the sign $\pm$ being $+$ if $p$ is even and $-$ if $p$ is odd.

The same relations would be obtained in the traversed media 15, 16, 17 after reflection on the surface 10.

If the reference $d\alpha$ is given to a small disorientation of the reflecting surface 10, the incidence on the face of the prism 15 is subjected to a variation $2d\alpha$. The angle of incidence then becomes $i_p + 2d\alpha$. In consequence, the angle of refraction $r_{p+1}$ is subjected to a variation $dr_{p+1}$ so that:

$$n_p \cos i_p \, di_p = n_{p+1} \cos r_{p+1} \, dr_{p+1}$$

and as $di_p = 2d\alpha$ $$2 n_p \cos i_p \, d\alpha = n_{p+1} \cos r_{p+1} \, dr_{p+1}$$

and so forth up to the final emergence, the variation of which is expressed as a function of the indices of the end media and of the medium in contact with the reflecting surface, as well as of the cosines of the angles of incidence and refraction on each face.

By a judicious choice of conditions of passage through the optical arrangement, the desired value ratio $$\frac{dr_{p+n}}{d\alpha}$$

may be obtained.

It is generally an advantage to form the optical arrangement so that the conditions of angles of incidence as well as of refraction should be symmetrical, as well as the indices of the different media on each side of the medium 11 in which the reflection takes place at a slightly variable incidence, and so that the reflecting surface 10, in its position of adjustment, should be at right angles to the axis of symmetry of the system.

In these conditions, the angles of incidence of the order of $p-x$ are equal to the angles of refraction of the order of $p+x$ and the expression of the value of variation of the angle of emergence $de$ may be simplified as follows:

$$de = dr_{2_{p-1}} = \frac{\pm 2n_p \cos r_p \cos r_{p-1} \cdots \cos r_2 \, d\alpha}{n_1 \cos i_{p-1} \cos i_{p-2} \cdots \cos i_1}$$

$+$ if $p$ is even
$-$ if $p$ is odd

In the case of the diagram, $p=5$:

$$de = dr_9 = \frac{-2n_5 \cos r_5 \cos r_4 \cos r_3 \cos r_2 \, d\alpha}{n_1 \cos i_4 \cos i_3 \cos i_2 \cos i_1}$$

It may be seen that in order to amplify $dr_9$ that is to say to increase the variation of the angle of emergence, the ratio $$\frac{n_5}{n_1}$$

should be increased while still arranging the optical path so that the product of the cosines of the angles of reflection should be relatively large and that the product of the cosines of the angles of incidence should be relatively small.

If it is required to reduce the variation of emergence the operation should be carried out in the inverse sense. In particular if it is desired that the emergent ray should form an angle which remains substantially constant with respect to the reflection surface in spite of small angular variations of this latter, it is necessary that $de = -d\alpha$ and therefore that:

$$n_1 \cos i_1 \cos i_2 \cos i_3 \cos i_4 =$$
$$2n_5 \cos r_2 \cos r_3 \cos r_4 \cos r_5$$

in the case in which $p=5$.

It should be observed that when this damping condition is fulfilled by virtue of a judicious choice of the indices and of the path of the light beam, the emergent beam has only a fixed direction with respect to this reflecting surface in the case of relatively small angular variations.

When these variations are greater the fixity of direction of the emergent beam is no longer retained. But the absence of fixity is always in the same direction, for example, in the positive direction, while the angular variations of the instrument with respect to the reflecting surface are positive or negative.

Thus in the case of a levelling instrument provided with the arrangement in accordance with the invention for stabilizing the sighting line by employing a reflecting surface which remains inherently horizontal, if the instrument is inclined slightly upwards or slightly downwards, the sighting leaves the horizontal plane only in the case of a substantial defect in the horizontal position of the arrangement, and the small accidental error of horizontality has always the same sign, thus facilitating its elimination by difference when calculating the difference in level.

By means of a small voluntarily performed rocking movement of the instrument, the observer may obtain the sighting line by tangenting the maximum or minimum division, but it is convenient to ensure the approximate horizontality of the instrument by using a spherical level, the purpose of the optical arrangement being only to provide an automatic means of ensuring the fine adjustment.

FIG. 2 shows the application of the device described above with respect to a levelling instrument using a floating mirror as a means of level adjustment.

The instrument comprises the ordinary telescopic lens 20 with object-lens 21, focal adjustment lens 22, a reticule 23 adjustable for height but fixed for distance, eyepiece lens 24 with adjustable focal setting. With this instrument is associated the automatic level device 25 placed in front of the object lens 21. This device consists of a mirror 26 mounted on a float 27 resting on sheet 28 of liquid, especially mercury.

The mirror limits a deformable volume 29, this being also closed by means of prisms 30 and 31 fixed to the instrument. These prisms are of flint glass having an index of 1.72 and their entrance and exit faces respectively are substantially vertical in the position of use. The prisms are arranged symmetrically, their angle at the apex being 31° 43′.

The conditions of optical damping are fulfilled, if there is obtained cos $i_2 = 2 \cos r_3$, since $n_1 = n_3 = 1$ for air and $i_1 = r_2 = 0$ with $i_2 = A_2$.

For the incidences of the light beam, there is obtained:

$$\sin i_2 = \frac{\sqrt{3}}{\sqrt{4n_2^2 - 1}} \text{ and } \sin r_3 = \frac{n_2\sqrt{3}}{\sqrt{4n_2^2 - 1}}$$

which, when $n_2 = 1.72$ results in the values:

$$i_2 = 31°43', r_3 = 64°50'$$

The approximate horizontality of the instrument is ensured by a spherical level 32 which the operator places approximately opposite his small sighting circle by means of three locking screws 42 (this could be effected by rotation about a swivel).

The float 27 carrying the mirror 26 of rectangular shape is toothed at 33 at its lower portion in order to brake the oscillations. The approximate centering of the mirror is effected at its center of thrust by a ball 34 housed in a hollow 35 in the top of a screw 36 enabling the height of the mirror to be adjusted (the ball remains on top since it floats in the mercury).

The vertical movement of the float 27 is limited by a rectangular elastic belt 37 of rubber or plastic material which can also be adapted to form a fluid-tight joint when the float is pressed against this belt, either by lifting the centering ball 34 or by compressing the mercury 28 by means of the large screw 38 which serves to adjust the level of the mercury.

The upper walls of the vessel containing the mercury 28 are sloped so that the angle of contact between the mercury and the surface should be in a substantially horizontal plane. The float 27 is also provided with sloping walls 39 for the same reason. The base of the vessel is notched at 40 so as to brake the movements of the float 27 and to limit its displacements.

In an alternative form, the floating mirror may be supported by four floats in four separate vessels which only communicate by means of narrow conduits connecting the four vessels together.

The adjustment of the horizontality of the surface of the floating mirror 26 is carried out in the workshop but a subsequent defect in the horizontality of the floating mirror can be corrected by adjusting the horizontal thread of the reticule 23. The entire assembly of the instrument is supported on a base 41 mounted on a locking screw 42.

In a less costly alternative form, the reflecting surface 26 is constituted by a mercury bath without a float.

In a further alternative form, the reflecting surface 26, supported by a float, is surmounted by a prism of the Wollaston or Dove type having faces substantially at right angles to the beam before and after reflection. With this arrangement, it is not necessary for the vessel to contain the mercury in a fluid-tight manner. In fact if the instrument should be upset during transport and the mercury spreads over the faces of the prism it is not possible for a drop of mercury to remain on these slanting faces as could happen in the case of a horizontal mirror and this would slightly disturb its horizontality obtained by flotation.

FIG. 3 is a view in cross-section of a gyroscopic sextant making use of the optical damping action in accordance with the invention in order to facilitate sighting on stars in order to take bearings, for example on board ship.

The object lens is shown at 53, the eyepiece lens is shown at 54 with its eyepiece 55, the reticule being shown at 56. The gyroscope 57 carrying the mirror 58 is mounted in front of the object lens. The gyroscope 57 as shown is driven by blown fluid (compressed air) although it may also be driven electrically. It is mounted so as to rotate at 59 on a support 60. Above the mirror 58 is provided a space 161 constituting the deformable volume by means of the oscillations of the gyroscope. This volume is limited on each side by the sets of prisms 61—62—63 and 64—65—66. The prisms 61 and 63 are of glass and separated from the prismatic air space 62. In the same manner the prismatic air space 65 separates the glass prisms 64 and 66. The sighting mirrors are located at 67 and 68. The mirror 68 is actuated by a suitable mechanism 69 with a measurement device 70.

By means of the prisms 61 to 66, a suitable incidence is produced on the mirror 58.

By applying the previous relations:

$$n_1 \cos i_1 \cos i_2 \cos i_3 \cos i_4 = 2n_5 \cos r_2 \cos r_3 \cos r_4 \cos r_5$$

with, in the air $$n_1 = n_3 = n_5 = 1; \ i_1 = r_2 = i_3 = r_4 = 0$$
$$\cos i_1 = \cos r_2 = \cos i_3 = \cos r_4 = 1$$
$$i_2 = i_4$$
$$r_3 = r_5$$

therefore $$1 \times 1 \times \cos i_2 \times 1 \times \cos i_2 = 2 \times 1$$
$$\times \cos r_3 \times 1 \times \cos r_3 \cos^2 i_2 = 2 \cos^2 r_3$$

therefore $$\cos^2 r_3 = \frac{1 - \sin^2 i_2}{2}$$

and since $$n_2 \sin i_2 = 1 \times \sin r_3 n_2^2 \sin^2 i_2 = \sin^2 r_3 = 1$$
$$- \cos^2 r_3 n_2^2 \sin^2 i_2 - 1 + \frac{1 - \sin^2 i^2}{2} = 0 \sin^2 i_2 (2n_2^2 - 1)$$
$$= 1 \sin i_2 = \frac{1}{\sqrt{2n_2^2 - 1}}$$

and $$\sin r_3 = \frac{n_2}{\sqrt{2n_2^2 - 1}}$$

The beam which emerges from the reticule 56 and passes through the object lens 53 enters the device through the prisms 66—64 and meets the first faces of said prisms with zero incidence. After these refractions, the beam is subjected to a reflection on the gyroscopic mirror 58 at a variable incidence of the small angle of slope of the instrument. The beam passes from the parallelized device to the gyroscopic mirror after the further refractions through the prisms 61-63 and is guided by double reflection onto the mirrors 67 and 68.

FIG. 4 is a view in cross-section of a lens for an automatic astrolabe of the mercury bath type. The lens may be seen at 71 with object lens 72, eyepiece lens 73 and reticule 74.

With this lens 71 is associated a tank 75 containing the mercury 76. Above the mercury 76 and in front of the object lens 72 there is placed a prism 77 the lower portion of which is provided at 78—79 with two oppositely placed sloping portions, thus avoiding the formation of parasite images. This prism 77 may also be constituted by two symmetrical members glued by their opaque vertical face in the plane of symmetry.

Between the lower portion of the prism 77 and the mercury 76 is located a deformable volume 80 preferably filled with inert gas. The internal walls of the tank 75 are sloped at 81. It should be observed that by means of this arrangement, the mercury is protected from wind and from oxidation.

Sighting is carried out at a zenithal distance of 30°. The beam enters with a zero incidence on the external face of the prism 77 provided with four flint faces each having an index of 1.72.

The prism 77 is symmetrical and the equal and opposite apex angles are 31°43'.

The two faces of entrance and emergence each form between each other 120°.

The two faces 77—79 in the vicinity of the mercury bath each form between each other an angle of 3°30', the angle of refraction at the exit of the face before reflection is 64°50'.

The damping condition is fulfilled in like manner only for the level shown in FIG. 2, since cos $i_2 = 2$ cos $r_3$ but the arrangement is different, the problem being to sight at a fixed zenithal distance instead of sighting horizontally.

The reflecting surface of the mercury may be replaced by a floating or swinging mirror.

What I claim is:

1. An optical device for modifying the direction of a beam of light having a single reflecting surface and a plurality of refracting surfaces fixed together and constituting a symmetrical unit with respect to a transverse plane thereof, said unit being associated with said single reflecting surface which is located in the center, movable and placed in position independently of said refracting surfaces by an external force such as gravity, the transverse plane of symmetry of said refracting surfaces being in the vicinity of the plane perpendicular to said single reflecting surface, said single reflecting surface including a prism coextensive therewith and being symmetrical about said transverse plane, said refracting surfaces in combination with said prism defining a deformable transparent medium constituting a prismatic medium of variable angles and being substantially symmetrical, said refracting surfaces and reflecting surface receiving the whole of the sighting beam at incidences in the vicinity of the angles determined in correspondence with their respective positions and with the refractive indices of the indeformable and deformable media, said device restoring the whole of the beam of light with variations in direction in a determined ratio with rotations of the device with respect to said single reflecting surface.

2. An optical device according to claim 1 in which said single reflecting surface and refracting surfaces are flat.

3. In an optical instrument comprising a sighting telescope defining the line of sight rigidly fixed to the instrument, the arrangement which consists in placing directly over the whole of the sighting beam, outside the unit of the lenses and the reticule, an optical device modifying the direction of the beam of light having a single reflecting surface and a plurality of refracting surfaces fixed together and constituting a unit symmetrical with respect to a transverse plane thereof, said unit being associated with said single reflecting surface which is situated in the center, movable and placed in position independently of said refracting surfaces by an external force such as gravity, the transverse plane of symmetry of the unit formed by said refracting surfaces being in the vicinity of the plane perpendicular to said single reflecting surface, said single reflecting surface including a prism coextensive therewith and being symmetrical about said transverse plane, said refracting surfaces in combination with said prism de-limiting a deformable transparent medium constituting a prismatic medium with variable angles and being substantially symmetrical, said refracting surfaces and reflecting surface receiving the whole of the sighting beam at incidences in the vicinity of the angles determined in correspondence with their respective positions and with the indices of refraction of the indeformable and deformable media, said device restoring wholly the exterior sighting beam with variations of inclination in a determined ratio differing from the equality with the small rotations of the instrument with respect to said single reflecting surface, and in particular in a nil ratio.

4. An optical device according to claim 3 in which said single reflecting surface and refracting surfaces are flat.

5. In an optical instrument comprising a sighting telescope defining the line of sight rigidly fixed to the instrument, the arrangement which consists in placing directly on the whole of the sighting beam, outside the unit of the lenses and the reticule, an optical device modifying the direction of the beam of light having a single flat reflecting surface and a plurality of flat refracting surfaces fixed together and constituting a unit symmetrical with respect to a transverse plane thereof, said unit being associated with said single flat reflecting surface which is located in the center, movable and placed in position independently of said flat refracting surfaces by an external force such as gravity, the transverse plane of symmetry of the unit formed by said flat refracting surfaces being in the vicinity of the plane perpendicular to said single flat reflecting surface, said single reflecting surface including a prism coextensive therewith and being symmetrical about said transverse plane, said flat refracting surfaces in combination with said prism de-limiting a deformable transparent medium constituting a prismatic medium with variable angles and being substantially symmetrical, said flat refracting surfaces and flat reflecting surface receiving the whole of the sighting beam at incidences in the vicinity of the angles determined in correspondence with their respective positions and with the indices of refraction of the indeformable and deformable media, said device restoring wholly the exterior sighting beam in a direction remaining practically fixed with respect to said single flat reflecting surface in spite of small rotations of the instrument with respect to said single flat reflecting surface.

6. In an optical instrument comprising a sighting telescope defining the line of sight rigidly fixed to the instrument, the arrangement which consists in placing directly on the whole of the sighting beam, outside the unit of the lenses and the reticule, an optical device modifying the direction of the beam of light having a single flat reflecting surface and a plurality of flat refracting surfaces fixed together and constituting a unit symmetrical with respect to a transverse plane thereof, said unit being associated with said single flat reflecting surface which is located in the center, movable and placed in position independently of said flat refracting surfaces by an external force such as gravity, the transverse plane of symmetry of the unit formed by said flat refracting surfaces being in the vicinity of the plane perpendicular to said single flat reflecting surface, said single reflecting surface including a prism coextensive therewith and being symmetrical about said transverse plane, said flat surfaces in combination with said prism de-limiting a deformable transparent medium constituting a prismatic merium with variable angles and being substantially symmetrical, said flat refracting surfaces and flat reflecting surface receiving the whole of the sighting beam at incidences in the vicinity of the angles determined in correspondence with their respective positions and with the indices of refraction of the indeformable and deformable media, said device restoring wholly the sighting beam in a direction remaining practically fixed with respect to said single flat reflecting surface for small rotations of the instrument with respect to said single flat reflecting surface, the differences in direction of the exterior sighting beam remaining always in the same sense, irrespective of the sense of the most important rotation of the instrument.

7. In an optical instrument comprising a sighting telescope defining the line of sight rigidly fixed to the instrument, the arrangement which consists in placing directly on the whole of the sighting beam, outside the unit of the lenses and the reticule, an optical device modifying the direction of the beam of light having a single flat reflecting surface and plurality of flat refracting surfaces fixed together and constituting a unit symmetrical with respect to a transverse plane thereof, said unit being associated with said single flat reflecting surface which is located in the center, movable and placed in position independently of said flat refracting surfaces by an external force such as gravity, the transverse plane of symmetry of the unit formed by said flat refracting surfaces being in the vicinity of the plane perpendicular to said single flat reflecting surface, said single reflecting surface including a prism coextensive therewith and symmetrical about said transverse plane, said flat refracting surfaces in combination with said prism de-limiting a deformable transparent medium constituting a prismatic medium with variable angles and being substantially symmetrical, said flat refracting surfaces and flat reflecting surface receiving the whole of the sighting beam at incidences in the vicinity of the angles determined in correspondence with their respective positions and with the indices of refraction of the indeformable and deformable media, said device restoring wholly the exterior sighting beam in a direction remaining substantially parallel to said single flat reflecting surface, in spite of rotations of the instrument with respect to said single flat reflecting surface.

8. In an optical instrument comprising a sighting telescope defining the line of sight rigidly fixed to the instrument, the arrangement which consists in placing directly on the whole of the sighting beam, outside the unit of the lenses and the reticule, an optical device modifying the direction of the beam of light having a single flat reflecting surface and a plurality of flat refracting surfaces fixed together and constituting a unit symmetrical with respect to a transverse plane thereof, said unit being associated with said single flat reflecting surface which is located in the center, movable and placed in position independently of said flat refracting surfaces by an external force such as gravity, the transverse plane of symmetry of the unit formed by said flat refracting surfaces being in the vicinity of the plane perpendicular to said single flat reflecting surface, said single reflecting surface including a prism coextensive therewith and being symmetrical about said transverse plane, said flat refracting surfaces in combination with said prism de-limiting a deformable transparent medium constituting a prismatic medium with variable angles and being substantially symmetrical, said flat refracting surfaces and flat reflecting surface receiving the whole of the sighting beam at incidences in the vicinity of the angles determined in correspondence with their respective positions and with the indices of refraction of the indeformable and deformable media, said device wholly restoring the exterior sighting beam in a direction remaining substantially parallel to said single flat reflecting surface for small rotations of the instrument with respect to said single flat reflecting surface, the lack of parallelism of the exterior sighting beam remaining always in the same sense irrespective of the sense of the greatest rotation of the instrument.

9. An optical device for modifying the direction of a beam of light having a single flat reflecting surface and a plurality of flat refracting surfaces fixed together and constituting a unit symmetrical with respect to a transverse plane thereof, said unit being associated with said single flat reflecting surface which is located in the center, movable and placed in position independently of said flat refracting surfaces by an external force such as gravity, the transverse plane of symmetry of the unit formed by said flat refracting surfaces being in the vicinity of the plane perpendicular to said single flat reflecting surface, said single reflecting surface including a prism coextensive therewith and being symmetrical about said transverse plane, said flat refracting surfaces in combination with said prism de-limiting a space filled with air constituting a prismatic medium with variable angles and being substantially symmetrical, said flat refracting surfaces and single flat reflecting surface receiving the whole of the sighting beam at incidences in the vicinity of the angles determined in correspondence with their respective positions and with the indices of refraction of the indeformable and deformable media, said device wholly restoring the exterior sighting beam in a direction remaining substantially parallel to said single flat reflecting surface in spite of rotations of the instrument with respect to said single flat reflecting surface.

10. An optical device for modifying the direction of a beam of light having a single flat reflecting surface and a plurality of flat refracting surfaces fixed together and constituting a unit symmetrical with respect to a transverse plane thereof, said unit being associated with said single flat reflecting surface which is located in the center, movable and placed in position independently of said flat refracting surfaces by an external force such as gravity, the transverse plane of symmetry of the unit formed by said flat refracting surfaces being in the vicinity of the plane perpendicular to said single flat reflecting surface, said single reflecting surface including a prism coextensive therewith and being symmetrical about said transverse plane, said flat refracting surfaces in combination with said prism de-limiting a space filled with air constituting a prismatic medium with variable angles and being substantially symmetrical, said flat refracting surfaces and flat reflecting surface receiving the whole of the sighting beam at incidences in the vicinity of the angles determined in correspondence with their respective positions and with the indices of refraction of the indeformable and deformable media, said device wholly restoring the exterior sighting beam in a direction remaining substantially parallel to said single flat reflecting surface for small rotations of the instrument with respect to said single flat reflecting surface, the lack of parallelism of the exterior sighting beam remaining always in the same sense irrespective of the sense of the greatest rotation of the instrument.

11. In an astrolabe, the arrangement which consists in associating with said astrolabe, in front of the sighting telescope, on the whole of the beam of light, a device comprising a mercury bath and a prism of polygonal section spaced apart from the free surface of said mercury bath, said prism presenting opposite said mercury bath two faces of symmetrical inclination and forming an apex directed away from said mercury bath, said prism having an index of refraction such that said device wholly restores the external beam with a determined zenithal height in spite of inclination of the astrolabe.

12. In an astrolabe, the arrangement which consists in associating with said astrolabe, in front of the sighting telescope, on the whole of the beam of light, a device comprising a mercury bath and a prism of polygonal section spaced apart from the free surface of said mercury bath, said prism having two faces of symmetrical inclination and forming an apex directed away from said mercury bath, said prism having a refractive index such that said device wholly restores the external beam with a determined zenithal height in spite of inclination of said astrolabe, the small variations of zenithal height remaining in the same sense irrespective of the sense of the largest inclinations of the astrolabe.

13. An artificial horizon for use in an optical instrument for determining the direction of an object relative to a horizontal plane comprising a reflecting surface mounted in said optical instrument, means operatively connected with said reflecting surface to maintain said reflecting surface in said horizontal plane, prismatic members mounted in said optical instrument and being symmetrically disposed on each side of said reflecting surface with respect to a transverse plane thereof, said prismatic members including apexes directed away from said reflecting surface, each of said prismatic members including a surface positioned substantially perpendicular to the entrance and emergence of rays of light, said reflecting surface including a prism coextensive therewith and being symmetrical about said transverse plane, said prismatic members and said prism coextensive with said reflecting surface defining a deformable transparent medium therebetween which constitutes an enclosed prismatic medium, an optical system mounted in said optical instrument adjacent one of said prismatic members whereby the whole of the sighting beam constituting rays of light which are substantially parallel to said reflecting surface are passed through one of said prismatic members where they are refracted onto said reflecting surface while passing through one portion of said enclosed prismatic medium and then said rays of light are reflected from said reflecting surface to the prismatic member adjacent said optical system while passing through the other portion of said enclosed prismatic medium, said rays of light while passing through the prismatic member adjacent said optical system are refracted into said optical system substantially parallel to said reflecting surface in spite of rotations of said optical instrument with respect to said reflecting surface.

14. An artificial horizon according to claim 13 in which a single prismatic member is disposed on each side of said reflecting surface.

15. An artificial horizon according to claim 13 in which two prismatic members are disposed on each side of said reflecting surface, and an air space constituting another prismatic medium is interposed between said two prismatic members.

References Cited in the file of this patent

UNITED STATES PATENTS

| | | |
|---|---|---|
| 2,386,621 | Luboshez | Oct. 9, 1945 |
| 2,533,686 | Peterson | Dec. 12, 1950 |

FOREIGN PATENTS

| | | |
|---|---|---|
| 874,021 | France | Apr. 3, 1942 |
| 1,171,765 | France | Oct. 6, 1958 |